(12) United States Patent
Karuppiah

(10) Patent No.: US 11,169,890 B2
(45) Date of Patent: *Nov. 9, 2021

(54) SYSTEM, METHOD AND PROGRAM PRODUCT FOR BACKING UP DATA

(71) Applicant: International Business Machines Corporation, Armonk, NY (US)

(72) Inventor: Rajkumar Karuppiah, Troy, MI (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1297 days.

This patent is subject to a terminal disclaimer.

(21) Appl. No.: 15/153,935

(22) Filed: May 13, 2016

(65) Prior Publication Data

US 2016/0253245 A1    Sep. 1, 2016

Related U.S. Application Data

(63) Continuation of application No. 14/452,567, filed on Aug. 6, 2014, now Pat. No. 9,413,857, which is a
(Continued)

(51) Int. Cl.
*G06F 11/00* (2006.01)
*G06F 11/14* (2006.01)
(Continued)

(52) U.S. Cl.
CPC ...... *G06F 11/1461* (2013.01); *G06F 11/1448* (2013.01); *G06F 11/1456* (2013.01);
(Continued)

(58) Field of Classification Search
None
See application file for complete search history.

(56) References Cited

U.S. PATENT DOCUMENTS

| 5,381,145 A | 1/1995 | Allen et al. |
| 6,182,122 B1 | 1/2001 | Berstis |

(Continued)

FOREIGN PATENT DOCUMENTS

| JP | 11312112 A | 11/1999 |
| JP | 2001331463 A | 11/2001 |

(Continued)

OTHER PUBLICATIONS

Search Report by Registered Searching Organization, Patent Application No. 2008-148498, Translated Mar. 1, 2016, 7 pages.
(Continued)

*Primary Examiner* — Polina G Peach
(74) *Attorney, Agent, or Firm* — Nicholas Bowman; Andrew D. Wright; Roberts Calderon Safran & Cole, P.C.

(57) ABSTRACT

System, method and program product for backing up a plurality of data files from a first server to a second server via a network. A determination is made that more than one compressed data file at the second server, downloaded by the first server, is waiting to be decompressed. A determination is made whether an amount of available processor resource in the second server exceeds a predetermined threshold. If the amount of available processor resource in the second server exceeds the predetermined threshold, a plurality of data decompression programs are invoked in the second server to decompress the plurality of compressed data files substantially concurrently, and data updates in the decompressed data files are applied to corresponding files in the second server.

9 Claims, 5 Drawing Sheets

Related U.S. Application Data continuation of application No. 11/758,860, filed on Jun. 6, 2007, now Pat. No. 8,874,518.

(51) Int. Cl.
*G06F 11/20* (2006.01)
*H04L 29/06* (2006.01)
*G06F 11/30* (2006.01)

(52) U.S. Cl.
CPC ...... *G06F 11/1464* (2013.01); *G06F 11/2038* (2013.01); *G06F 11/2097* (2013.01); *H04L 69/04* (2013.01); *G06F 2201/805* (2013.01); *G06F 2201/84* (2013.01); *G06F 2201/875* (2013.01)

(56) References Cited

U.S. PATENT DOCUMENTS

| | | | |
|---|---|---|---|
| 6,351,775 | B1 | 2/2002 | Yu |
| 6,505,216 | B1 | 1/2003 | Schutzman et al. |
| 6,775,751 | B2 | 8/2004 | Tremaine |
| 6,785,786 | B1 | 8/2004 | Gold et al. |
| 6,819,271 | B2 | 11/2004 | Geiger et al. |
| 6,941,428 | B2 | 9/2005 | Carr |
| 7,281,051 | B2 | 10/2007 | Whynot et al. |
| 7,574,424 | B2 | 8/2009 | Chowdhuri |
| 7,734,602 | B2 | 6/2010 | Folkert et al. |
| 8,874,518 | B2 | 10/2014 | Karuppiah |
| 2001/0024239 | A1 | 9/2001 | Feder et al. |
| 2002/0188691 | A1 | 12/2002 | Ignatius et al. |
| 2003/0126247 | A1 | 7/2003 | Strasser et al. |
| 2004/0073710 | A1 | 4/2004 | Fallon |
| 2004/0073746 | A1 | 4/2004 | Fallon |
| 2004/0196498 | A1* | 10/2004 | Klassen ............ G06F 3/1212 358/1.15 |
| 2005/0015489 | A1 | 1/2005 | Whynot et al. |
| 2005/0015641 | A1 | 1/2005 | Alur et al. |
| 2005/0108484 | A1 | 5/2005 | Park |
| 2005/0180038 | A1* | 8/2005 | Chikashige ........ G06F 11/1461 360/1 |
| 2005/0235003 | A1 | 10/2005 | Folkert et al. |
| 2006/0179083 | A1 | 8/2006 | Kulkarni et al. |
| 2006/0195464 | A1 | 8/2006 | Guo |
| 2006/0198518 | A1 | 9/2006 | Iwatsu et al. |
| 2007/0096954 | A1* | 5/2007 | Boldt ................ H03M 7/30 341/50 |
| 2008/0306977 | A1 | 12/2008 | Karuppiah |
| 2009/0154545 | A1* | 6/2009 | Fallon ............... H03M 7/30 375/240 |
| 2014/0351218 | A1 | 11/2014 | Karuppiah |

FOREIGN PATENT DOCUMENTS

| | | |
|---|---|---|
| JP | 2002007441 A | 1/2002 |
| JP | 2002244908 A | 8/2002 |
| JP | 2003006016 A | 1/2003 |
| JP | 2003337711 A | 11/2003 |
| JP | 2005332298 A | 12/2005 |
| JP | 2006004229 A | 1/2006 |
| JP | 2006100973 A | 4/2006 |
| JP | 2006338409 A | 12/2006 |

OTHER PUBLICATIONS

Decision to Grant a Patent, Patent Application No. 2008-148498, Date of Drafting: Heisei 25 Mar. 13, 2013, Translated Mar. 1, 2016, 3 pages.

Notification of Reasons for Refusal, Patent Application No. 2008-148498, Date of Drafting: Heisei 24 Dec. 10, 2012, Translated Mar. 1, 2016, 3 pages.

Written Argument, Patent Application No. 2008-148498, Translated Mar. 1, 2016, 4 pages.

Teodosiu et al., "Optimizing File Replication over Limited-Bandwidth Networks using Remote Differential Compression", 2006, Research TR-2006, research.microsoft.com, 16 pages.

* cited by examiner

SYSTEM, METHOD AND PROGRAM PRODUCT FOR BACKING UP DATA

CROSS REFERENCE TO RELATED APPLICATION

This is a Continuation application of copending U.S. Ser. No. 14/452,567, filed Aug. 6, 2014, which is itself a Continuation application of U.S. Ser. No. 11/758,860, filed Jun. 6, 2007, which is now U.S. Pat. No. 8,874,518.

FIELD OF THE INVENTION

The invention relates generally to distributed computer systems, and more specifically to backing up data from a production server to a backup server.

BACKGROUND OF THE INVENTION

Known disaster recovery solutions involve periodic copying or backing up of data from a production server to a remote backup server via a network. The backup data typically comprises data, such as bank accounts, generated by applications executing in the production server. The backup server typically includes the applications and operating system that are installed at the production server. If there are updates to the applications and operating system in the production server, an administrator typically receives these updates from the manufacturer and installs them at both the production server and backup server. Consequently, if the production server fails and cannot be recovered in a predetermined amount of time, then production operations can continue using the current data and latest versions of applications and operating system at the backup server. When the original production server resumes operation, any intervening updates to the data made at the backup server can be copied to the original production server.

In the foregoing scenario, typically the updates to the data at the production server are logged at the production server, and the update logs (not the entire files at the production server) are copied to the backup server. This reduces the amount of data that needs to be downloaded via the network to the backup server. Also, typically, the production server compresses the data before downloading to the backup server to further reduce the amount of data that needs to be downloaded to the backup server. Nevertheless, the download may consume a substantial portion of the network bandwidth between the production server and the backup server. Also, the process of compressing a large file may take a significant amount of processor resource at the production server.

When the backup server receives compressed update logs, the backup server must decompress them and then restore the corresponding files at the backup server, i.e. apply the updates to the corresponding existing data files at the backup server to make them current and synchronized with those in the production server. The decompression process may consume a significant amount of processor resource at the backup server depending on the amount of data to be decompressed.

An object of the present invention is to expedite the download of data updates from a production server to a backup server and expedite the application of those updates to corresponding files in the backup server.

SUMMARY OF THE INVENTION

The present invention resides in a system, method and program product for backing up a plurality of data files from a first server to a second server via a network. A determination is made that more than one compressed data file at the second server, downloaded by the first server, is waiting to be decompressed. A determination is made whether an amount of available processor resource in the second server exceeds a predetermined threshold. If the amount of available processor resource in the second server exceeds the predetermined threshold, a plurality of data decompression programs are invoked in the second server to decompress the plurality of compressed data files substantially concurrently, and data updates in the decompressed data files are applied to corresponding files in the second server.

The present invention also resides in a system, method and program product for backing up a plurality of data files from a first server to a second server via a network. A determination is made that more than one data file at the first server is waiting to be compressed. A determination is made whether an amount of available processor resource at the first server exceeds a first predetermined threshold and whether an amount of available bandwidth of the network exceeds a second predetermined threshold. If the amount of available processor resource at the first server exceeds the first predetermined threshold and the amount of available bandwidth of the network exceeds a second predetermined threshold, a plurality of data compression programs are invoked at the first server to compress the plurality of data files substantially concurrently. After compression, the plurality of data files are downloaded from the first server to the second server.

According to a feature of the present invention, a determination is made that more than one data file at the second server, downloaded by the first server, is waiting to be decompressed. A determination is made whether an amount of available processor resource at the second server exceeds a predetermined threshold. If the amount of available processor resource at the second server exceeds the predetermined threshold, a plurality of data decompression programs are invoked at the second server to decompress the plurality of data files substantially concurrently, and the data updates in the decompressed data files are applied to corresponding files in the second server.

DETAILED DESCRIPTION OF THE PREFERRED EMBODIMENTS

Figure 1:
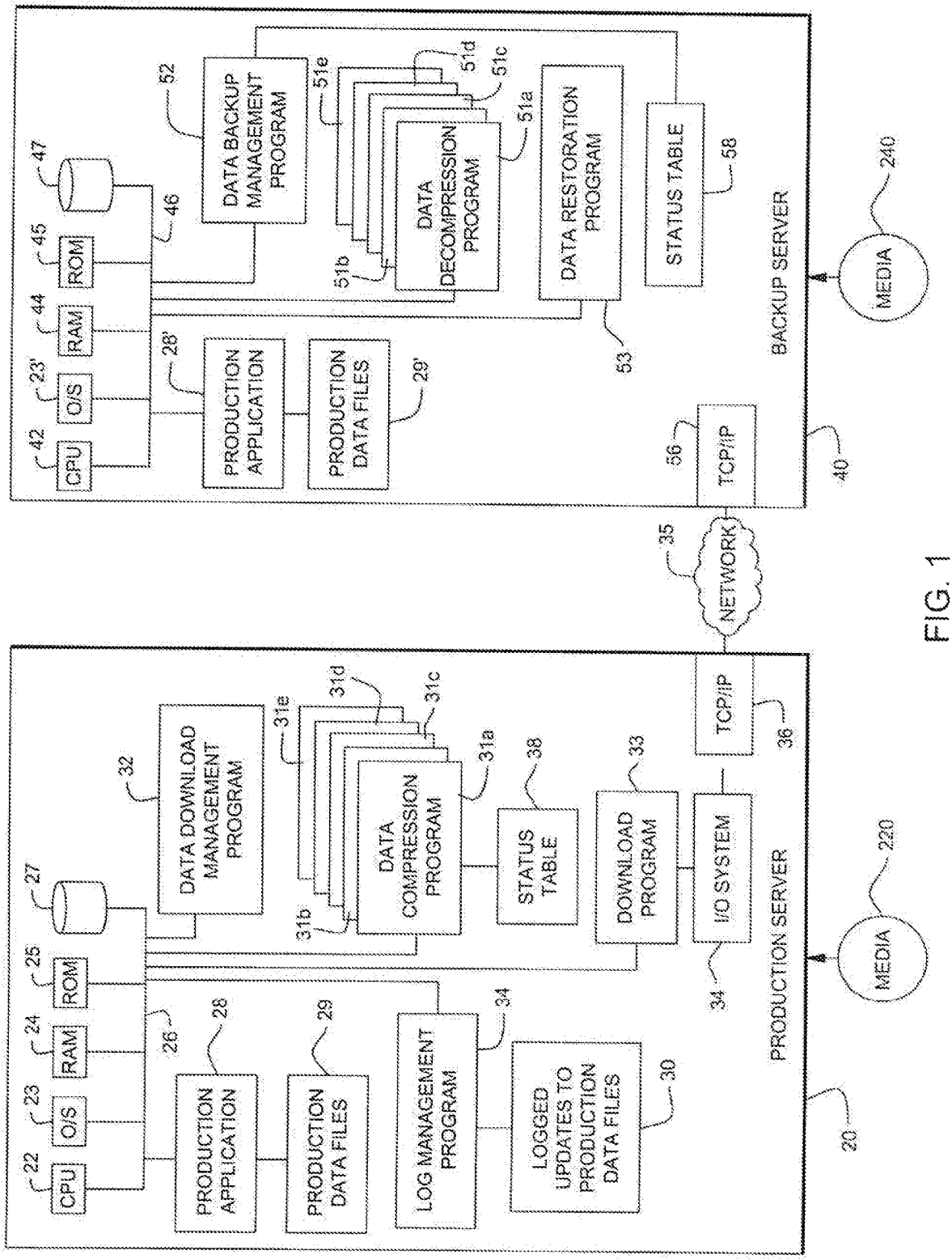
FIG. 1 is a block diagram of a distributed computer system, including a production server and a backup server, in which the present invention is embodied.

The present invention will now be described in detail with reference to the figures. FIG. 1 illustrates a distributed computer system generally designated 10 which includes a production server 20 and a backup server 40 in which the present invention is embodied.

Production server 20 includes known processor 22, operating system 23, RAM 24, and ROM 25 on a common bus 26 and storage 27. Production server 20 also includes a known production application 28 (such as Microsoft SQL server application), data files 29 for production application 28, and an update log 30 which records all changes to data files 29, production application 28 and operating system 23. Each time there is a change to data files 29, production application 28 or operating system 23, a log management program 34 records these changes in the update log 30 in a known manner. Production server 20 also includes known compression programs 31a,b,c,d,e for example, to perform Wienrar (™ of Eugene Roshal) compression or WinZip compression (for limited size files). Production server 20 also includes a known download program 33 to perform the actual download of data to backup server 40 via network 35 (such as WAN DS3, MAN or the Internet). To download a file to backup server 50, download program 33 first establishes a connection/session with backup server, and then controls an I/O system 34 to physically download the file via TCP/IP adapter card 36. (If backup server 50 is down or there is a problem with network 35, then download program 33 may not be able to complete the download. In such a case, program 33 will retry a number of times, and if still unsuccessful, notify an administrator.) Production server 20 also includes a data download management program 32, according to the present invention, to manage the download of the data (i.e. typically data generated by application 28) and determine whether to use more than one data compression program 31a,b,c,d,e in parallel to compress and download the data. As explained in more detail, this decision is based on the number of files waiting to be compressed and their length, the availability of the processor 22 to perform the compression in parallel, and the availability of the network bandwidth 35 to accommodate the download of so much data generated by parallel compression.

Backup server 40 includes known processor 42, operating system 23', RAM 44, and ROM 45 on a common bus 46 and storage 47. Operating system 23' may be identical to operating system 23. Backup server 40 also includes a copy of the known production application 28', a copy of data files 29' (periodically synchronized from the production data files 29 from the production server 20). Backup server 40 also includes known decompression programs 51a,b,c,d,e for example, to perform the type of decompression as needed for the type of compression in the downloaded files. Backup server 40 also includes a known data restoration program 53 to restore the data files 29' as the updates are received and decompressed from the production server 20. As known in the prior art, the restoration program 53 applies to the production data files 29' the data updates which are received from the production server and decompressed, to synchronize the production data files 29' in the backup server with the production data files 29 in the production server 20. Backup server 40 also includes a data backup management program 52, according to the present invention, to manage the decompression and restoration of the data updates, and determine whether to use more than one data decompression program in parallel to decompress the data received from the production server. As explained in more detail, this decision is based on the number of files waiting to be decompressed and the availability of the processor 42 to perform the decompression.

Figure 2:
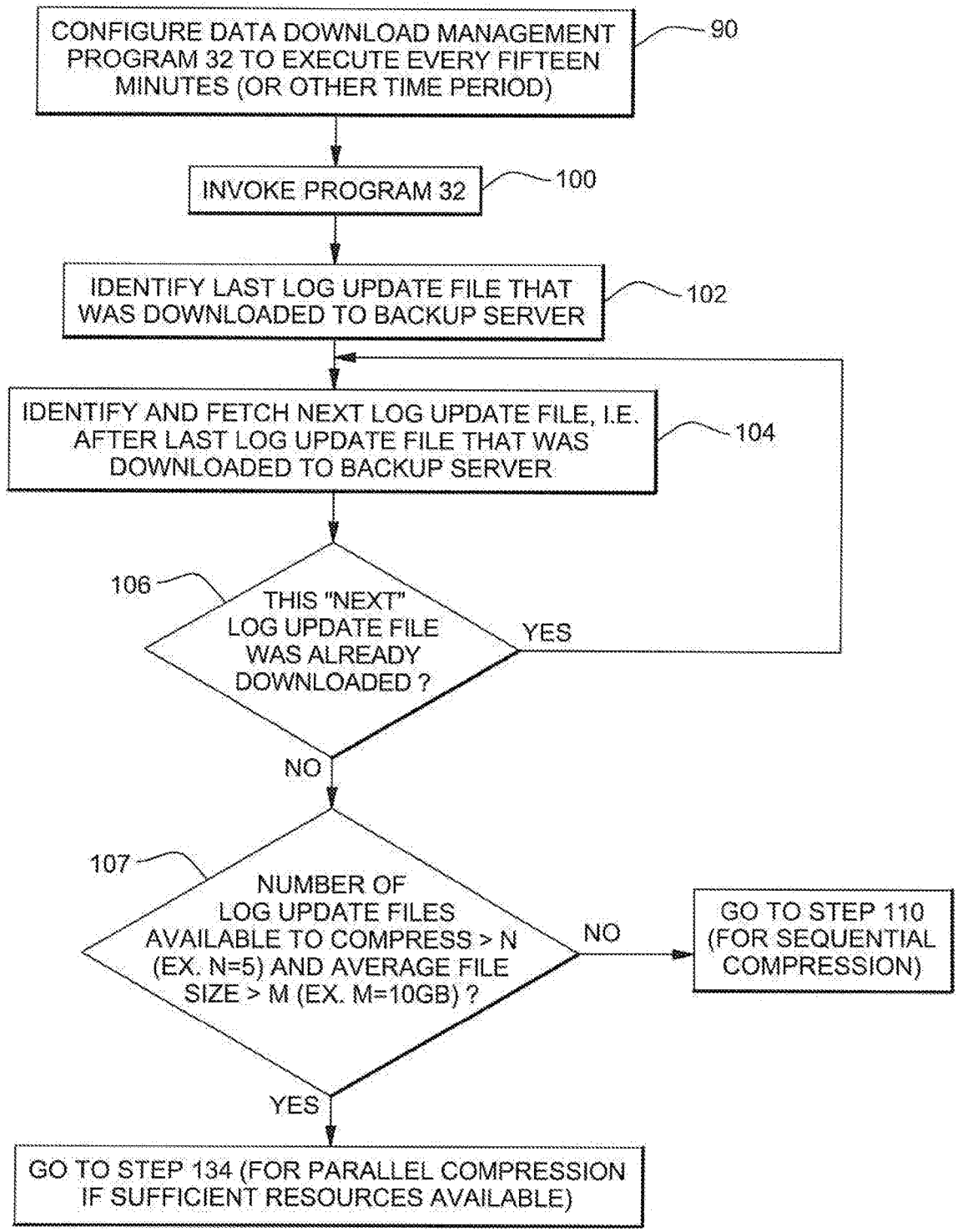
FIGS. 2(A), 2(B) and 2(C) form a flowchart of a data download management program in the production server of FIG. 1, according to the present invention.
Figure 2B:
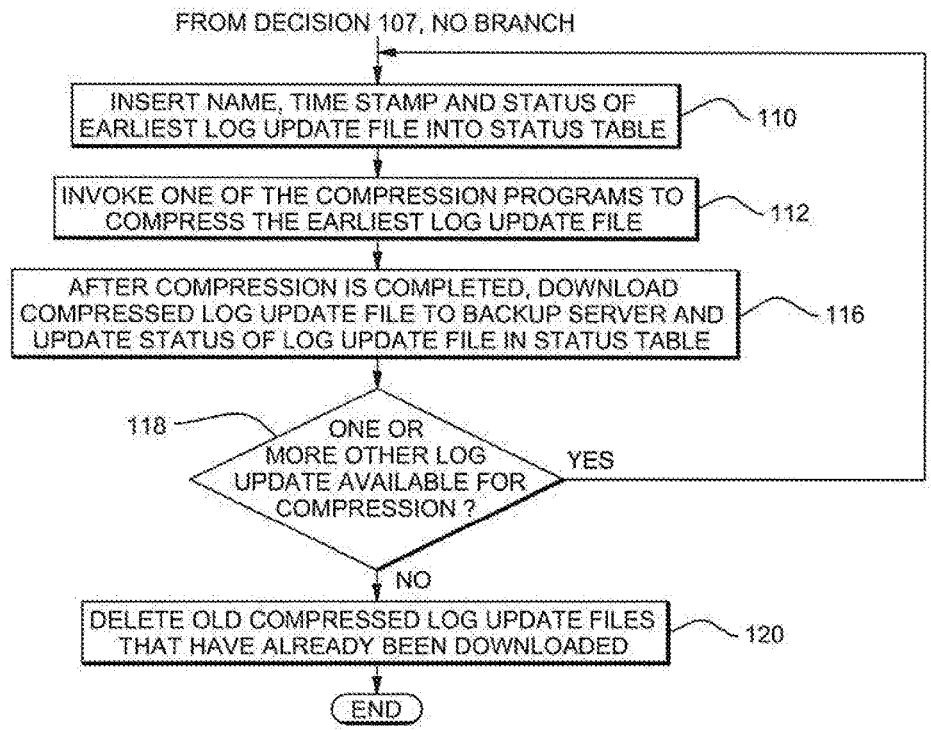
Figure 2C:
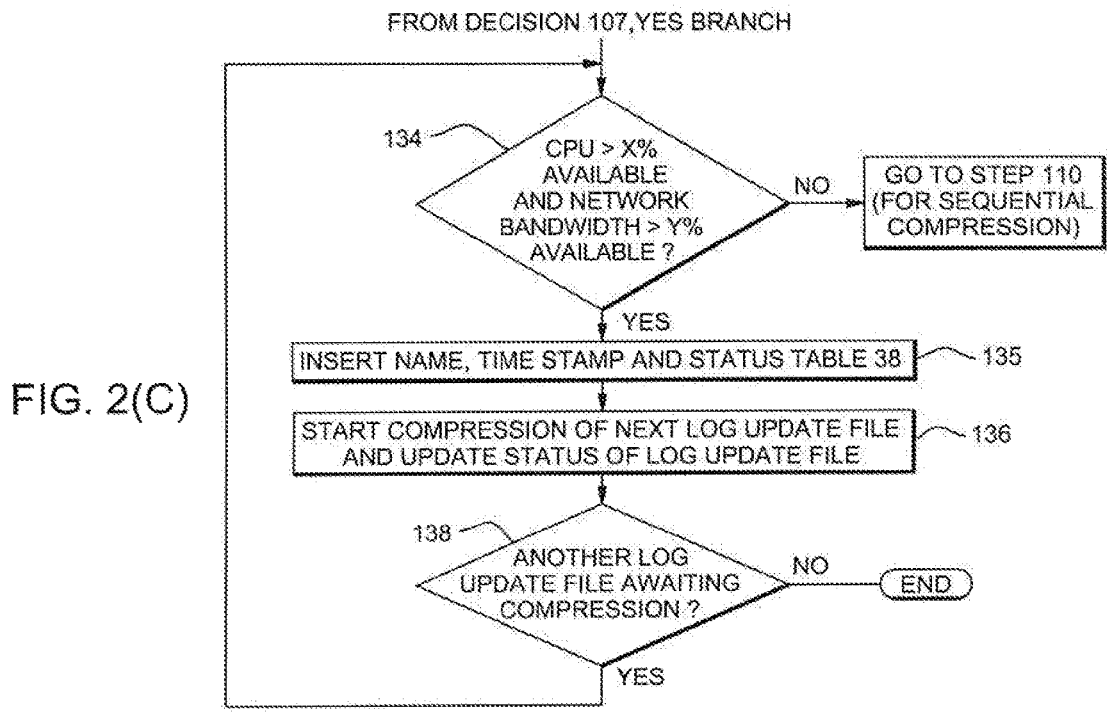

FIGS. 2(A), 2(B) and 2(C) describe the implementation and use of data download management program 32, in more detail. Log management program 34 logs to update log 30 each update to data files 29. Typically, the updates to data files 29 are made by application 28 (but could also be made by other programs as well.) Log management program 34 learns of the updates to data files 29 from the production application 28. Periodically, such as every fifteen minutes, log update program 34 defines a new log update file comprising logged updates to data file 29' during the last predetermined interval, such as the last fifteen minutes. When defining each new log update file, log management program 34 records a corresponding entry in a Status Table 38 identifying a name, time stamp or other sequence identifier and status (i.e. "waiting for compression and download") of this new log update file. Log management program 34 also embeds the name and time stamp in the log update file itself. An administrator initially configures program 32 to execute every predetermined period, such as every fifteen minutes, to backup data from production server 20 to backup server 50 (step 90).

In step 100, operating system 23 invokes program 32, based on the configured periodic timer, such as every fifteen minutes. In response, program 23 reads from Status Table 38 a time stamp or other sequence identifier of the last log update file in the production server 20 that was compressed and downloaded to backup server 40 (step 102). (Each such file is a collection of data updates from the update log 30 made by the application 28 within a respective predetermined period, such as fifteen minutes. Log management program 34 assigned a time stamp or sequential identifier to each log update file when program 34 defined the log update file.) Next, program 32 identifies and fetches the next, sequential log update file, i.e. the log update file with the next later time stamp or sequential identifier, defined in the Status Table 38 (step 104). Next, program 32 checks from the Status Table 38 whether this next log update file has already been compressed and downloaded (decision 106). If so (decision 106, yes branch), then program 32 loops back to step 104 to identify and fetch the next, sequential log update file. Assuming this next sequential log update file has not yet been compressed or downloaded (decision 106, no branch), then program 32 determines the number of additional log update files that are ready to compress and download and their average length. If there are not more than a predetermined threshold number, such as five, of log update files waiting to be compressed with an average length more than a predetermined threshold, such as ten GB (or if the total number of bytes in all files ready to be compressed and downloaded does not exceed a predetermined threshold number, such as fifty GB (decision 107, no branch), then program 32 proceeds to step 110 to compress these log update files serially. In the serial processing mode, program 32 inserts the name of the log update file (currently being processed), its time stamp and a status bit (i.e. "selected for compression and download") into Status Table 38 to record the status of the current log update file to be processed (step 110). Next, program 32 invokes data compression program 31a identifying the address in memory of the current log update file (step 112). In response, data compression program 31a compresses the current log update file which is being processed. After the compression program 31a compresses the current log update file, program 32 invokes download program 33 to download the current compressed log update file to backup server 40 and updates the Status Table 38 to indicate that the current log update file has been compressed and downloaded (step 116).

Next, program 32 determines from Status Table 38 if there are one or more additional log update files ready to compress and download (decision 118). If so (decision 118, yes branch), program 32 loops back to steps 110, 112 and 116 to process (i.e. update status table, compress and download) the next sequential log update file in the manner described below. Program 32 iteratively, serially repeats steps 110, 112 and 116 for each additional, sequential log update file waiting to be processed. Because a single data compression program 31a has been used for all log update files in the sequential processing mode, this minimizes burden on the processor and network bandwidth. When there are no additional log update files to compress (decision 118, no branch), then program 32 deletes the definition and contents of any log update files which have successfully been compressed and downloaded to backup server 50 (step 120).

Refer again to decision 107, yes branch where there are more than a predetermined threshold number, such as five, of log update files waiting to be compressed and downloaded, and the average length of the log update files is more than a predetermined threshold, such as ten GB, (or alternately the total number of bytes in all log update files ready to be compressed and downloaded exceeds a predetermined threshold number, such as fifty GB). In such a case, program 32 determines if the available percentage of CPU resource is greater than a predetermined threshold, such as 40%, and the available percentage of network bandwidth is greater than a predetermined threshold, such as 60% (decision 134). If not (decision 134, no branch), then program 32 loops back to step 110 to serially process the next sequential log update file (i.e. define it, compress it with data compression program 31a after data compression program 31a completes compression of the previous log update file), download it with download program 33 after download program 33 completes download of the previous log update file) in the manner described above in steps 110, 112 and 116. However, if the available percentage of CPU resource is greater than the respective predetermined threshold and the available percentage of network bandwidth is greater than the respective predetermined threshold (decision 134, yes branch), then program 32 identifies the next sequential log update file awaiting compression (i.e. the "first current" log update file) and updates Status Table 38 to indicate processing of the first current log update file (step 135). Next, program 32 invokes data compression program 31a to compress the first current log update file and also notifies the data compression program 31 to call the download program 33 upon completion of the compression of the first current log update file to download the compressed, first log update file to the backup server (step 136). Immediately after invoking data compression program 31a (and before data compression program 31a completes its compression of the first current log update file), program 32 determines from Status Table 38 that there are one or more additional log update files awaiting compression (decision 138, yes branch), and then loops back to decision 134 to determine if the available percentage of CPU resource is still greater than the respective predetermined threshold and the available percentage of network bandwidth is still greater than the respective predetermined threshold. If not (decision 134, no branch), then program 32 loops to step 110 to process the next sequential log update file serially, i.e. after compression of the first current log update file. However, if the available percentage of CPU resource is still greater than the respective predetermined threshold and the available percentage of network bandwidth is still greater than the respective predetermined threshold (decision 134, yes branch), then program 32 identifies the next sequential log update file awaiting compression (i.e. the "second current" log update file) and updates Status Table 38 to indicate processing of the second current log update file (step 135). Next, program 32 invokes data compression program 31b to compress the second current log update file (step 136). Immediately after invoking data compression program 31b (and before data compression program 31b completes its compression of the second current log update file), program 32 determines from Status Table 38 that there are one or more additional log update files awaiting compression (decision 138, yes branch), and then loops back to decision 134 to determine if the available percentage of CPU resource is still greater than the respective predetermined threshold and the available percentage of network bandwidth is still greater than the respective predetermined threshold. If not (decision 134, no branch), then program 32 loops to step 110 to process the next sequential log update file serially, i.e. after compression of the second current log update file. However, if the available percentage of CPU resource is still greater than the respective predetermined threshold and the available percentage of network bandwidth is still greater than the respective predetermined threshold (decision 134, yes branch), then program 32 identifies the next sequential log update file awaiting compression (i.e. the "third current" log update file) and updates Status Table 38 to indicate processing of the third current log update file (step 135). Next, program 32 invokes data compression program 31c to compress the third current log update file (step 136). Immediately after invoking data compression program 31c (and before data compression program 31c completes its compression of the third current log update file), program 32 determines from Status Table 38 that there are one or more additional log update files awaiting compression (decision 138, yes branch), and then loops back to decision 134 to determine if the available percentage of CPU resource is still greater than the respective predetermined threshold and the available percentage of network bandwidth is still greater than the respective predetermined threshold. If not (decision 134, no branch), then program 32 loops to step 110 to process the next sequential log update file serially, i.e. after compression of the third current log update file. However, if the available percentage of CPU resource is still greater than the respective predetermined threshold and the available percentage of network bandwidth is still greater than the respective predetermined threshold (decision 134, yes branch), then program 32 identifies the next sequential log update file awaiting compression (i.e. the "fourth current" log update file) and updates Status Table 38 to indicate processing of the fourth current log update file (step 135). Next, program 32 invokes data compression program 31d to compress the fourth current log update file (step 136). Immediately after invoking data compression program 31d (and before data compression program 31a completes its compression of the fourth current log update file), program 32 determines from Status Table 38 that there are one or more additional log update files awaiting compression (decision 138, yes branch), and then loops back to decision 134 to determine if the available percentage of CPU resource is still greater than the respective predetermined threshold and the available percentage of network bandwidth is still greater than the respective predetermined threshold. If not (decision 134, no branch), then program 32 loops to step 110 to process the next sequential log update file serially, i.e. after compression of the first current log update file. However, if the available percentage of CPU resource is still greater than the respective predetermined threshold and the available percentage of network bandwidth is still greater than the respective predetermined threshold (decision 134, yes branch), then program 32 identifies the next sequential log update file awaiting compression (i.e. the "fifth current" log update file) and updates Status Table 38 to indicate processing of the fifth current log update file (step 135). Next, program 32 invokes data compression program 31e to compress the fifth current log update file (step 136). The foregoing process is repeated for each additional log update file awaiting compression; however, execution of step 136 waits until one of the compression programs 31a-e becomes available after completing compression of the last log update file that program 32 assigned to it. Thus, if there is sufficient available processor resource and network bandwidth, program 32 directs parallel/concurrent compression of waiting log update files to expedite the compression and download of the waiting log update files.

If the network connection 35 between production server 20 and backup server 50 fails or backup server 50 fails, then data download program 33 will not download any compressed files to backup server 50. Nevertheless, data download management program 32 will still direct compression of the log update files that accumulate while the network connection or backup server 50 is down. Consequently, when the network connection 35 and backup server 50 resume operation, then production server 20 will have multiple, compressed log up files ready to be downloaded to backup server 50. In such a case, program 32 will direct data download program 33 to download to backup server 50 the multiple compressed log update files, and this will occur rapidly.

Figure 3A:
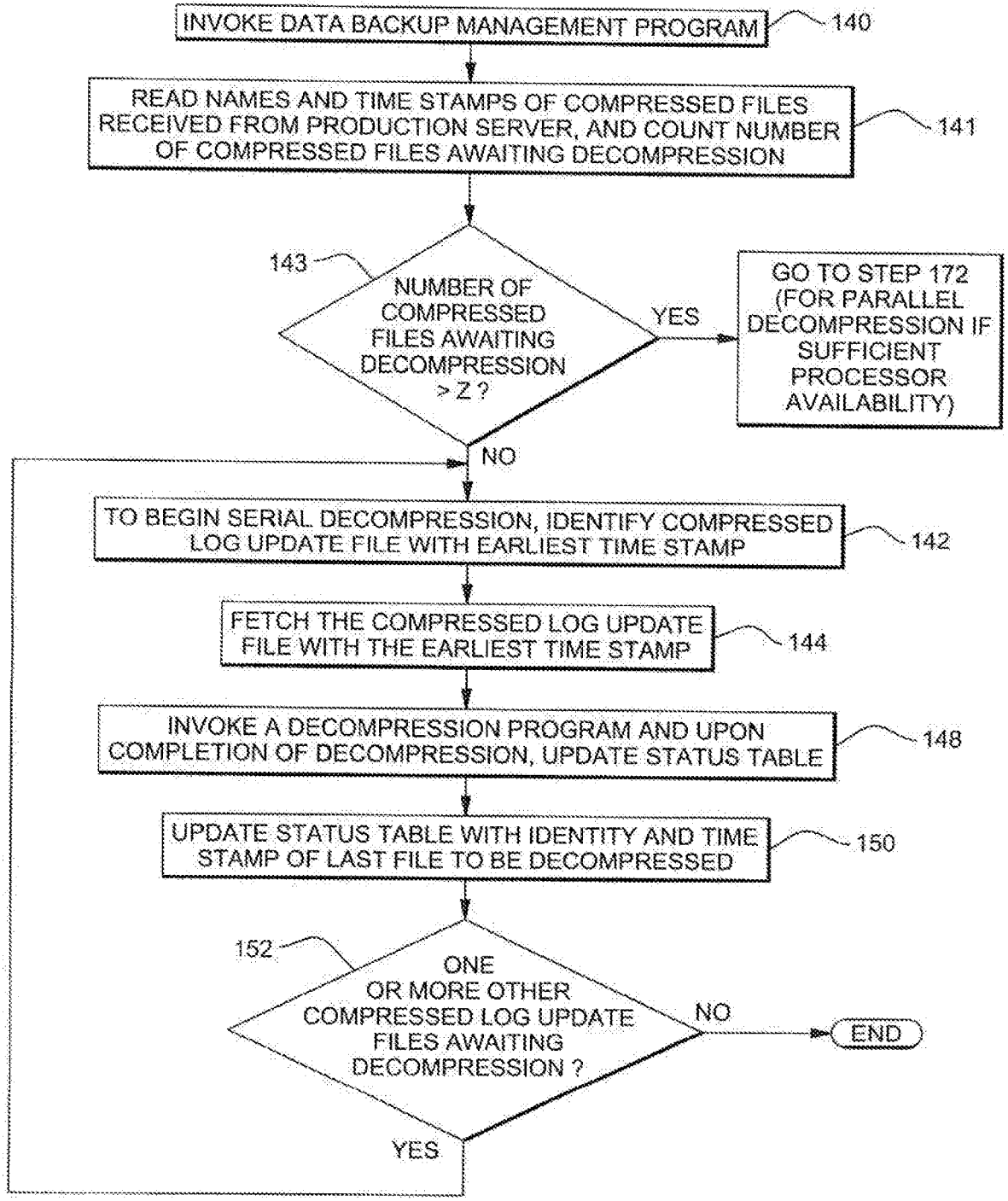
FIGS. 3(A) and 3(B) form a flowchart of a data backup management program in the backup server of FIG. 1, according to the present invention.
Figure 3B:
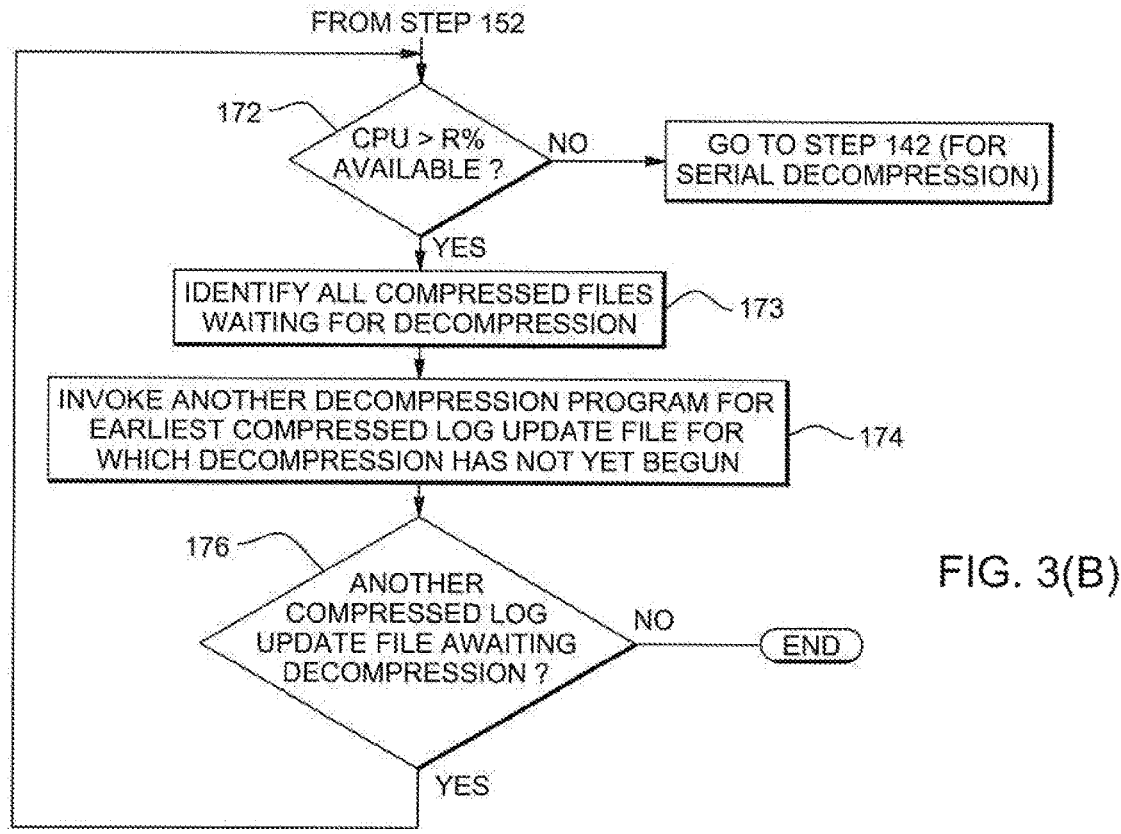

FIGS. 3(A) and 3(B) illustrate operation and implementation of data backup management program 52 in backup server 40. In response to receipt of one or more compressed log update files from production server 20, backup server 40 invokes data backup management program 52 (step 140). In response, program 52 reads the name and time stamp from the received compressed log update file(s) and records the name, time stamp and status (i.e. "ready for decompression") in Status Table 58 (step 142). If the number of compressed files awaiting decompression is less than a predetermined number (for example, five) (decision 143, no branch), then data backup management program 52 will initiate decompression of them serially. Thus, program 52 identifies the earliest (compressed) log update file (downloaded from production server 20) from Status Table 58 based on earliest time stamp, or next sequence number after the last log update file whose status is "processing completed" (step 142), and then fetches the earliest (compressed) log update file from memory of backup server 40 (step 144). Next, program 52 invokes data decompression program 51a to decompress this earliest, compressed log update file (step 148). After completion of the decompression, program 52 updates Status Table 58 to indicate that this log update file has been decompressed (step 148).

After completing decompression of each log update file in step 148, program 52 updates a Schedule Table 57 to identify the date and time of the last log update file (received from production server 20 in compressed form) that was decompressed (step 150). This time stamp of last log update file to be decompressed (plus the time until the data in the decompressed log update file has been restored) approximately indicates the time during which the data in the backup server is out of synchronization with the data in the production server. Typically, the customer wants that time period to fall within predetermined bounds. Next, program 52 determines from Status Table 59 if there are one or more other compressed log update file from production server 20 waiting for decompression (decision 152). If so (decision 152, yes branch), then program 52 loops back to step 142 to serially decompress this next log update file as described above with reference to steps 142, 144, 148 and 150, using the same decompression program 51a as decompressed the prior log update file (which has just completed its decompression of the prior log update file). However, if currently there are no more compressed log update files waiting for decompression (decision 152, no branch), then program 52 ends its execution (until the next compressed log update file is received).

Refer again to decision 143, yes branch, where there are more than the predetermined number (such as five) of compressed log update files downloaded from production server 20 and awaiting decompression at the backup server 40. In such a case (decision 143, yes branch), then program 52 determines if the available processor resource at backup server 40 is greater than a threshold, such as 40% (decision 172). If not (decision 172, no branch), then program 52 proceeds to step 142 to process the earliest compressed log update file serially, i.e. after decompression of the log update file that was just decompressed. However if the available processor resource at backup server 40 is greater than the threshold (decision 172, yes branch), then processor 52 identifies from Status Table 58 all of the compressed log update files received from production server 20 that are awaiting start of decompression (step 173). Next, program 52 invokes data decompression program 51b to decompress the next later compressed log update file for which decompression has not yet been started (step 174). Next, program 52 determines if there are one or more other compressed log update files awaiting decompression (decision 176). If so (decision 176, yes branch), then program 52 determines if the available processor resource at backup server 40 is still greater than the threshold, such as 40% (decision 172). If not (decision 172, no branch), then program 52 proceeds to step 142 to process the next later compressed log update file serially, i.e. after decompression of the log update file currently being decompressed. However if the available processor resource at backup server 40 is greater than the threshold (decision 172, yes branch), then processor 52 identifies from Status Table 58 all of the compressed log update files received from production server 20 that are awaiting decompression (step 173). Next, program 52 invokes data decompression program 51c to decompress the next later compressed log update file for which decompression has not yet been started (step 174). Next, program 52 determines if there are one or more other compressed log update files awaiting decompression (decision 176). If so (decision 176, yes branch), then program 52 determines if the available processor resource at backup server 40 is still greater than the threshold, such as 40%. If not (decision 172, no branch), then program 52 proceeds to step 142 to process the next later compressed log update file serially, i.e. after decompression of the log update file currently being decompressed. However if the available processor resource at backup server 40 is greater than the threshold (decision 172, yes branch), then processor 52 identifies from Status Table 58 all of the compressed log update files received from production server 20 that are awaiting decompression (step 173). Next, program 52 invokes data decompression program 51d to decompress the next later compressed log update file for which decompression has not yet been started (step 174). Next, program 52 determines if there are one or more other compressed log update files awaiting decompression (decision 176). If so (decision 176, yes branch), then program 52 determines if the available processor resource at backup server 40 is still greater than the threshold, such as 40%. If not (decision 172, no branch), then program 52 proceeds to step 142 to process the next later compressed log update file serially, i.e. after decompression of the log update file currently being decompressed. However if the available processor resource at backup server 40 is greater than the threshold (decision 172, yes branch), then processor 52 identifies from Status Table 58 all of the compressed log update files received from production server 20 that are awaiting decompression (step 173). Next, program 52 invokes data decompression program 51d to decompress the next later compressed log update file for which decompression has not yet been started (step 174). Next, program 52 determines if there are one or more other compressed log update files awaiting decompression (decision 176). If so (decision 176, yes branch), then program 52 determines if the available processor resource at backup server 40 is still greater than the threshold, such as 40%. If not (decision 172, no branch), then program 52 proceeds to step 142 to process the next later compressed log update file serially, i.e. after decompression of the log update file currently being decompressed. However if the available processor resource at backup server 40 is greater than the threshold (decision 172, yes branch), then processor 52 identifies from Status Table 58 all of the compressed log update files received from production server 20 that are awaiting decompression (step 173). Next, program 52 invokes data decompression program 51e to decompress the next later compressed log update file for which decompression has not yet been started (step 174). Thus, multiple compressed log update files are decompressed in parallel/concurrently provided sufficient processor resource is available in the backup server. Next, program 52 determines if there are one or more other compressed log update files awaiting decompression (decision 176). If so (decision 176, yes branch), then program 52 determines if the available processor resource at backup server 40 is still greater than the threshold, such as 40% (decision 172). If not (decision 172, no branch), then program 52 proceeds to step 142 to process the next later compressed log update file serially, i.e. after decompression of the log update file currently being decompressed. However if the available processor resource at backup server 40 is greater than the threshold (decision 172, yes branch), then processor 52 identifies from Status Table 58 all of the compressed log update files received from production server 20 that are awaiting decompression (step 173). Next, program 52 attempts to invoke the next available data decompression program 51a-e to decompress the next later compressed log update file for which decompression has not yet been started (step 174). However, program 52 may have to wait until one of the decompression programs 51a-e completes decompression of the prior log update file assigned to it and becomes available. The foregoing process is performed for the other log update files awaiting decompression. Decompression programs 51a-e all send to a predetermined file the identities, time stamps and addresses of the log update files that they have decompressed.

Figure 4:
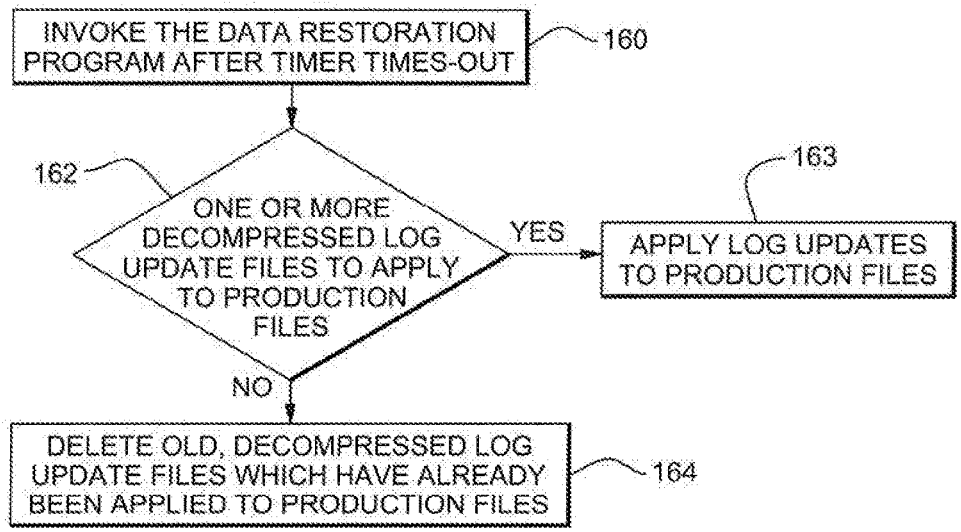
FIG. 4 is a flowchart of a data restoration program within the backup server of FIG. 1.

FIG. 4 illustrates implementation and operation of the data restoration program 53. Periodically, such as every five minutes, the data restoration program 53 begins execution (step 160) and checks whether there are decompressed log update files received from the production server waiting to be applied to production data files 29' at the backup server (decision 162). During decision 162, data restoration program 53 checks identities, time stamps and addresses of decompressed files decompressed by any of the decompression programs. If any such decompressed log update files are waiting to be applied to production data files at the backup server (decision 162, yes branch), then data restoration program 53 applies the updates from the decompressed log update file to the data files 29' in the backup server (step 163). This "restores" the data files 29' in the backup server to a more current level. Data restoration program 53 completes step 163 for each decompressed file (decision 162, yes branch), until there are no more decompressed log update files (decision 162, no branch). Data restoration program 53 completes step 163 for each decompressed file (decision 162, yes branch), regardless of whether the decompressed files are decompressed serially or in parallel. Data restoration program applies the decompressed log updates in sequential order based on their respective time stamps. After the data updates in all decompressed log update files have been applied to the data files 29', program 53 deletes the decompressed log update files which have been successfully applied to data files 29' (step 164).

Data download management program 32, data compression programs 31a-e, download program 33 and log management program 34 can be loaded into production server 20 from a computer readable media 220 such as magnetic tape or disk, optical media, DVD, memory stick or semiconductor memory, or downloaded from the Internet via TCP/IP adapter card 36.

Data backup management program 52, data decompression programs 51a-e and data restoration program 53 can be loaded into backup server 40 from a computer readable media 240 such as magnetic tape or disk, optical media, DVD, memory stick or semiconductor memory, or downloaded from the Internet via TCP/IP adapter card 56.

Although not shown in FIG. 1, production server 20 also includes a data backup management program, data decompression programs, a data restoration program, and another status table analogous to data backup management program 52, data decompression programs 51a-e, data restoration program 53, and status table 59, respectively, in backup serer 40. Also, backup server 40 also includes a data download management program, data compression programs, another status table, a download program, an I/O system, a log management program and logged updates to production data files analogous to data download management program 32, data compression programs 31a-e, status table 38, download program 33, I/O system 34, log management program 34 and logged updates to production data files 30, respectively, in production computer 20. Consequently, if production server 20 fails and production computing reverts to backup server 40, then backup server 40 has all the program functions to perform production computing and backup log update files to production server 20 upon resumption of operation of production server 20. Likewise, production server 20, upon resumption of operation, has all the program functions to process the log update files from backup server 40.

Based on the foregoing, a system, method and program product for backing up data have been disclosed. However, numerous modifications and substitutions can be made without deviating from the scope of the present invention. For example, the download period can be modified based on the time required to perform the compression, so that if many of the compressions take longer than the original download period, the download time can be increased. Also, after an extended outage of network 35 or the backup server, program 32 can estimate the time required to resynchronized the backup server with the production server based on the time required to download the compressed files from the production server, and the time required to decompress the compressed files at the backup server. This estimate is based on the length of the compressed files, the available network bandwidth and speed, and the speed of the decompression program(s) at the backup server. Therefore, the present invention has been disclosed by way of illustration and not limitation, and reference should be made to the following claims to determine the scope of the present invention.

What is claimed:

1. A method for processing two or more data update files waiting to be compressed at a primary server for transmission to a backup server, the two or more data update files including data updates to one or more data files stored at both the primary server and the backup server, the backup server being coupled to the primary server via a network, the method comprising:
the primary server selectively compressing the two or more data update files waiting to be compressed at least partially in parallel rather than sequentially only responsive to determining both that the primary server has more than a predetermined level of available processor power and that the network has more than a predetermined level of available bandwidth; and
the primary server sending to the backup server via the network the two or more data update files which have been compressed so the backup server can update the corresponding one or more data files at the backup server.

2. A computer system for processing two or more data update files waiting to be compressed at a primary server for transmission to a backup server, the two or more data update files including data updates to one or more data files stored at both the primary server and the backup server, the backup server being coupled to the primary server via a network, the computer system comprising:
a central processing unit (CPU);
a memory coupled to the CPU; and
a computer readable hardware storage device coupled to the CPU;
first program instructions, for execution at the primary server, to selectively compress the two or more data update files waiting to be compressed at least partially in parallel rather than sequentially only responsive to determining both that the primary server has more than a predetermined level of available processor power and that the network has more than a predetermined level of available bandwidth; and
second program instructions,
for execution at the primary server, to send to the backup server via the network the two or more data update files which have been compressed so the backup server can update the corresponding one or more data files at the backup server; and wherein
the first and second program instructions are stored on the computer-readable hardware storage device.

3. The computer system of claim 2, wherein the selectively compressing the two or more data update files at least partially in parallel rather than sequentially only responsive to determining both that the primary server has more than a predetermined level of available processor power and that the network has more than a predetermined level of available bandwidth comprises:
the primary server selectively postponing compression of any other of the two or more data update files until after completing compression of one of the two or more data update files responsive to determining, while compressing the one data update file, both that the available processor power of the primary server has decreased to less than the predetermined level of available processor power and that the bandwidth of the network has continued to be more than the predetermined level of available bandwidth.

4. The computer system of claim 2, wherein the selectively compressing the two or more data update files at least partially in parallel rather than sequentially only responsive to determining both that the primary server has more than a predetermined level of available processor power and that the network has more than a predetermined level of available bandwidth comprises:
the primary server selectively postponing compression of any other of the two or more data update files until after completing compression of one of the two or more data update files responsive to determining, while compressing the one data update file, both that the available processor power of the primary server has continued to be more than the predetermined level of available processor power and that the bandwidth of the network has decreased to less than the predetermined level of available bandwidth.

5. The computer system of claim 2, wherein the selectively compressing the two or more data update files at least partially in parallel rather than sequentially is further only responsive to a quantity of the two or more data update files being more than a predetermined number of data update files.

6. The method of claim 1, wherein the selectively compressing the two or more data update files at least partially in parallel rather than sequentially only responsive to determining both that the primary server has more than a predetermined level of available processor power and that the network has more than a predetermined level of available bandwidth comprises:
the primary server selectively postponing compression of any other of the two or more data update files until after completing compression of one of the two or more data update files responsive to determining, while compressing the one data update file, both that the available processor power of the primary server has decreased to less than the predetermined level of available processor power and that the bandwidth of the network has continued to be more than the predetermined level of available bandwidth.

7. The method of claim 1, wherein the selectively compressing the two or more data update files at least partially in parallel rather than sequentially only responsive to determining both that the primary server has more than a predetermined level of available processor power and that the network has more than a predetermined level of available bandwidth comprises:
the primary server selectively postponing compression of any other of the two or more data update files until after completing compression of one of the two or more data update files responsive to determining, while compressing the one data update file, both that the available processor power of the primary server has continued to be more than the predetermined level of available processor power and that the bandwidth of the network has decreased to less than the predetermined level of available bandwidth.

8. The method of claim 1, wherein the selectively compressing the two or more data update files at least partially in parallel rather than sequentially is further only responsive to a quantity of the two or more data update files being more than a predetermined number of data update files.

9. A computer comprising:
a memory; and
a processor configured to obtain program instructions from the memory that are configured to cause the processor to:
selectively compress a plurality of data files waiting to be compressed at the computer for transmission via a network to another computer at least partially in parallel responsive to determining both that the computer has more than a predetermined level of available processor power and that the network has more than a predetermined level of available bandwidth;

selectively compress the plurality of data files sequentially responsive to determining both that the computer has less than a predetermined level of available processor power and that the network has more than a predetermined level of available bandwidth;

selectively compress the plurality of data files sequentially responsive to determining both that the computer has more than a predetermined level of available processor power and that the network has less than a predetermined level of available bandwidth;

selectively compress the plurality of data files sequentially responsive to determining both that the computer has less than a predetermined level of available processor power and that the network has less than a predetermined level of available bandwidth; and send the plurality of data files which have been compressed to the another computer via the network.

* * * * *